United States Patent [19]

Broussard et al.

[11] Patent Number: 4,975,518

[45] Date of Patent: Dec. 4, 1990

[54] POLYACETAL COPOLYMERS OF TRIOXANE AND 1,2,6-HEXANETRIOL FORMAL DERIVATIVES

[75] Inventors: Jerry A. Broussard, Summit; Andrew B. Auerbach, Livingston; James L. Paul, Summit, all of N.J.

[73] Assignee: Hoechst Celanese Corporation, Somerville, N.J.

[21] Appl. No.: 350,791

[22] Filed: May 12, 1989

[51] Int. Cl.$^5$ .............................................. C08G 4/00
[52] U.S. Cl. .................................. 528/230; 528/241; 528/245; 528/247; 528/250
[58] Field of Search ............... 528/230, 241, 245, 247, 528/250

[56] References Cited

U.S. PATENT DOCUMENTS

| | | | |
|---|---|---|---|
| 3,027,352 | 3/1962 | Walling et al. | 528/241 |
| 3,281,499 | 10/1969 | Dolce et al. | 525/411 |
| 3,436,375 | 4/1969 | McAndrew | 528/241 |
| 3,457,229 | 7/1969 | Fischer et al. | 528/249 |
| 3,471,466 | 10/1969 | Hayes | 524/843 |
| 3,555,121 | 1/1971 | Tanaka et al. | 525/154 |
| 3,749,755 | 7/1973 | Bronstert et al. | 525/64 |
| 3,903,197 | 9/1975 | Ishida et al. | 524/248 |
| 4,076,727 | 2/1978 | Zey et al. | 549/372 |
| 4,713,441 | 12/1987 | Heller et al. | 528/392 |
| 4,758,608 | 7/1988 | Collins et al. | 522/43 |
| 4,792,579 | 12/1988 | Satoh et al. | 524/145 |
| 4,876,368 | 10/1989 | Broussard et al. | 549/374 |

FOREIGN PATENT DOCUMENTS 1512216 2/1967 France .
1026777 4/1966 United Kingdom .

OTHER PUBLICATIONS

CA72(20):101554a "Polyacetal Hot-Melt Adhesives".
CA69(14):5213d "Heat-Resistant Copolyacetals from Trioxane and Cyclic Ethers".

*Primary Examiner*—John Kight, III
*Assistant Examiner*—Sam A. Acquah
*Attorney, Agent, or Firm*—Nixon & Vanderhye

[57] ABSTRACT

Cationic copolymerization of trioxane and 1,2,6-hexanetriol formal (HTF) or its ester derivatives yields acetal copolymers having pendant functional groups. The HTF formal or ester derivatives of HTF may therefore include functional groups selected from hydroxyl or ester moieties which are protected, and thus survive, the copolymerization with trioxane. These groups may then be present as functional reactive sites for the subsequent synthesis of block copolymers and/or to chemically bind modifiers to the acetal copolymer backbone, for example.

20 Claims, No Drawings

POLYACETAL COPOLYMERS OF TRIOXANE AND 1,2,6-HEXANETRIOL FORMAL DERIVATIVES

FIELD OF INVENTION

This invention relates to acetal polymers which are structurally related to polyoxymethylene (i.e., polymers having recurring —CH$_2$O— units). More specifically, the invention relates to a novel class of acetal copolymers formed by the copolymerization of the comonomers trioxane and 1,2,6-hexanetriol formal and its ester derivatives.

BACKGROUND AND SUMMARY OF THE INVENTION

Acetal polymers represent an important class of engineering resins due to numerous favorable physical properties. For this reason, acetal polymers have a wide range of commercial applications, for example, as parts for automobiles, as plumbing components and a variety of household and personal products.

It is oftentimes desireable to modify one or more of the inherently advantageous physical properties of acetal polymers so as to meet the needs of specific end-use applications. Normally, to achieve such modified properties, acetal polymers have been blended with a variety of other resins and/or ingredients (e.g., impact modifying agents, flame retardants, light and heat stabilizers, fillers, and the like). Usually the blending of acetal polymers is not without its own problems due principally to the highly crystalline nature of acetal polymers which is evident in a low level of compatibility with other polymers.

Grafting of a different resin and/or a specific chemical moiety onto a polyacetal backbone would present an attractive alternative to blending so as to achieve a block copolymer having the desired modified physical and/or chemical properties. However, with acetal polymers, grafting is usually not possible due to the low level of polyacetal end group functionality—that is, since each acetal copolymer molecule carries a maximum of two functional groups, e.g., hydroxyl end groups.

According to the present invention, however, a novel class of polyacetal copolymers is provided which retain the beneficial physical and chemical properties of conventional acetal polymers, while yet also providing greatly increased functionality. Therefore, the acetal copolymers of this invention may be reacted with other resins and/or chemical moieties so as to, for example, permit a variety of acetal polymers to be synthesized having chemically bound (i.e., not merely blended) modifying agents.

Broadly, the copolymers of the present invention are obtained by the cationic copolymerization of trioxane with 1,2,6-hexanetriol formal or an ester derivative of 1,2,6-hexanetriol formal. The resulting copolymer will therefore exhibit side chain functionality so as to enable synthesis of, for example, block copolymers comprised of the acetal copolymer of this invention and other specific polymers to achieve desired chemical and/or physical properties.

These, as well as other aspects and advantages of the present invention will become more clear after careful consideration is given to the following detailed description of the preferred exemplary embodiments.

DETAILED DESCRIPTION OF THE PREFERRED EXEMPLARY EMBODIMENTS

The 1,2,6-hexanetriol formal (HTF) and its ester derivatives useful as a comonomer in the cationic copolymerization with trioxane according to the present invention are of the general formula

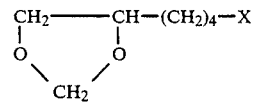

where X is a hydroxyl radical, or an ester radical. Suitable ester radicals include, for example, saturated aliphatic esters, unsaturated aliphatic esters, substituted saturated aliphatic esters, and aromatic esters (e.g., benzoic acid). Thus, for example, X may be represented by the formulas —OH;

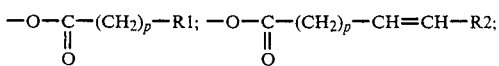

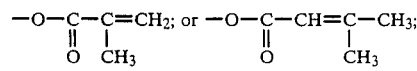

where each p is an integer from zero to 8, R1 is a methyl or phenyl radical, and R2 is hydrogen or a methyl or phenyl radical.

Alternatively, X may be represented by halogen substituted esters of the above formulas, for example, halogen substituted alkanoic acids (e.g., 2-chloro-ethanoic acid or 3-chloro-propanoic acid).

The resulting copolymer will have oxymethylene units (—CH$_2$O) interspersed with units derived from the HTF or the HTF ester derivative comonomer. The functionalized moieties will thus be present in the copolymer as pendant groups along the copolymer's backbone as represented by the structural Formula I, exclusive of chain terminating groups:

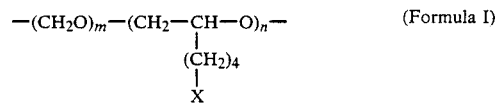

(Formula I)

where the pendant functional group X is as defined above, and m and n are each integers such that m+n is between 5 to 20000, and the mole ratio of units of subscript n to the units of subscript m is between about 1:5000 to 1:1, and preferably less than about 1:20.

The copolymers of Formula I are essentially linear, but may also be cross-linked (particularly when X is represented by a hydroxyl group) via the side chain acting as a cross-linking agent. These cross-linked copolymers are usually insoluble in most organic solvents, and will typically exhibit low molecular weights.

The ester group of the 1,2,6-hexanetriol formal derivatives employed as comonomers according to this invention are much less reactive (essentially nonreactive) during polymerization as compared to the formal group itself or the trioxane. As a result, the copolymers according to this invention are essentially linear with side chain functionality of (CH$_2$)$_4$X, when X in the 1,2,6-hexanetriol formal derivative is an ester group. The pendant functional group X may then be employed to react with other moieties to form, for example, a graft copolymer having a backbone of the Formula I but with side chain groups of a desired chemical moiety replacing the functionalized group X.

Alternatively, the ester functional group can be hydrolyzed after polymerization to yield a pendant hydroxyl functional group for use in subsequent grafting onto the polyacetal backbone. Hydrolysis, in addition to converting pendant ester groups to hydroxyl groups also effects removal of unstable hemiacetal end groups and improves stability of the resulting polyacetal copolymers of this invention.

The molecular weights of the acetal copolymers according to this invention are greater than about 1500, for example, up to about 500.000 (preferably up to about 250,000). The higher molecular weight copolymers are particularly preferred since lower molecular weight copolymers could then be obtained by including well known chain transfer agents (e.g., dimethoxymethane) to reduce the molecular weights to those that may be desired for any given end use application.

The preferred catalysts used in the preparation of the copolymers of the present invention are boron trifluoride and its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3^{19}$ $Et_2O$) is the preferred coordination complex used in the cationic copolymerization processes of the present invention. Alternately, gaseous $BF_3$ may be employed as the polymerization initiator. In general, the initiator should be present in the polymerization zone in amounts such that its boron fluoride content is between about 1 to 10000 ppm, preferably 10 to 1000 ppm, and more preferably 50 to 200 ppm.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields and to maximize molecular weights of the resulting copolymers.

Monomers other than trioxane and 1,2,6-hexanetriol formal or its functionalized derivatives may also be employed in the practice of this invention so as to form terpolymers or tetrapolymers—that is, a polymer having units in the chain derived from trioxane, 1,2,6-hexanetriol or its functionalized derivatives, and the other monomer(s) which may be employed. In general, these additional monomers that may be employed are cyclic ethers and cyclic acetals with ethylene oxide, 1,3-dioxolane, 1,3-dioxepane, 1,3-dioxep-5-ene, and 1,3,5-trioxepane being particularly preferred.

As used herein and in the accompanying claims, the term "copolymer" is intended to encompass any polymer having, as at least part of the polymer chain, structural units derived from trioxane and 1,2,6-hexanetriol formal or its ester functionalized derivatives. Thus, the term "copolymer" as used herein and in the accompanying claims is intended to encompass terpolymers, tetrapolymers, and the like which include structural units in the polymer chain derived from trioxane and 1,2,6-hexanetriol formal or its ester functionalized derivatives, in addition to other units derived from, e.g., the cyclic ether or cyclic acetal monomers described above, if present during polymerization.

The acetal copolymers of this invention may be formed by either bulk or solution polymerization processes. In the solution polymerization process, for example, the trioxane, 1,2,6-hexanetriol formal or its ester derivative, and catalyst are dissolved in a common anhydrous solvent, such as cyclohexane, and permitted to react in a sealed reaction zone. The temperature in the reaction zone may vary from about 0° C. to about 100° C. When employing bulk copolymerization techniques, the temperature in the reaction zone may be greater than about 65° C. but less than 100 to 110° C. The period of reaction may vary from about a few minutes to about 72 hours or more. Pressures from sub-atmospheric to about 100 atmospheres, or more may be used, although pressures between about 1 to 10 atmospheres are presently preferred.

During polymerization, some of the trioxane will react to form a homopolymer. In addition, unstable end groups formed in the copolymerization and unreacted monomer may be present after the reaction has proceeded for a sufficient time period. The trioxane homopolymer, the unstable end groups and/or any unreacted monomer may be removed by base hydrolysis so as to generate stable structures of the acetal copolymers of this invention. Generally, this base hydrolysis involves dissolving the crude copolymer in a suitable solvent, and maintaining the solution at elevated temperatures sufficient to remove hemiacetal end groups and/or saponify ester groups. The hydrolysis, however, should be such that the acrylate groups in the side chains will undergo minimum saponification (i.e., when the HTF comonomer is an acrylate derivative). The polymer may then be cooled to precipitate out the solid material.

The present invention is further illustrated by way of the following non-limiting examples.

EXAMPLE I

A. Synthesis of 1,2,6-Hexanetriol Formal 1,2,6-hexanetriol (503 g., 3.75 moles), paraformaldehyde (147 g., 4.89 moles), toluene (1300 g.) and methane sulfonic (70%, 9.8 g.) were reacted to form 1,2,6-hexanetriol formal. The mixture was heated at reflux and the water of reaction was collected overhead. The reaction product mixture was neutralized with excess aqueous $Na_2CO_3$. 1,2,6-hexanetriol formal (151 g.) was obtained by single stage vacuum distillation (b.p. 95–100° C., 1mm Hg). The identity and purity of the material were confirmed by NMR spectroscopy.

B. Synthesis of 1,2,6-Hexanetriol Formal Acetate 1,2,6-hexanetriol formal (229 g., 1.57 mole) was reacted with acetic anhydride (158 g., 2.00 moles) and pyridine (200 g., 1.96 mole) for five hours at 64° C. to form 1,2,6-hexanetriol formal acetate. The product was purified by single stage vacuum distillation. The yield of 1,2,6-hexanetriol formal acetate (b.p. 98–101° C., 0.7 mm Hg) was 227 grams. The identity and purity of the material were confirmed by NMR spectroscopy.

EXAMPLE II

Purification of Trioxane

The trioxane used was distilled at 114° C. from sodium metal to remove water with benzophenone as indicator, under the protection of dry nitrogen. Two hundred grams of trioxane (Aldrich Co.) was placed in a 500 ml round bottom flask equipped with a magnetic stirrer. The system was heated to about 80° C., then 0.5 gram of sodium metal and 0.3 gram of benzophenone was added under stirring. When water was removed by sodium, the color of solution changed from light yellow to brown, then to blue. After the appearance of the blue color, the temperature was raised to about 114° C. for distillation. Early portions of the distillate were discarded. The collected later portions had a water content of about 40–70 ppm.

Copolymerization of Trioxane and HTFA

Trioxane and 1,2,6-hexanetriol formal acetate (HTFA) were copolymerized according to the conditions identified in Tables 1 and 2 below. 45 cc of trioxane and HTFA in the amounts identified in Table 1 were added to an appropriate reaction vessel heated to about 80° C. Thereafter $BF_3 \cdot Et_2O$ as initiator was added and the time between initiator addition and the appearance of an exotherm (e.g., an increase in the reaction mixture temperature of at least about 5° C.) was recorded as the induction time. The reaction was allowed to continue for at least 20 minutes and thereafter allowed to cool to room temperature for about 40 minutes. The resulting copolymer was recovered and broken into small particles. The particles were then soaked in an aqueous solution containing 0.5 wt% triethylamine (TEA) so as to neutralize the initiator. The copolymer was then subjected to hydrolysis by adding, in an autoclave, 25.0 grams of the crude copolymer to a TEA solution comprised of 1% TEA, 34% methanol and 65% water. The copolymer and TEA solution were heated to between 180° C. to 190° C. and maintained at that temperature for about 30 minutes. After cooling, the hydrolyzed copolymer was washed, filtered and dried in a recrystallizing dish.

merization process. These functional moieties will therefore provide a reactive site for the subsequent synthesis of block copolymers and/or to chemically bind modifiers to the acetal copolymer backbone, for example.

While the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An essentially linear acetal copolymer of the formula:

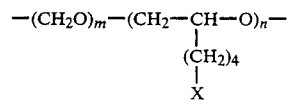

where X is an ester radical or a hydroxyl radical obtained by hydrolyzing an ester radical, m and n are each integers such that m+n is between 5 to 20000, and the mole ratio of units of subscript n to the units of subscript m is between about 1:5000 to 1:1, and wherein said acetal copolymer is the reaction product of trioxane and an ester derivative of 1,2,6-hexanetriol formal.

2. An essentially linear acetal copolymer comprising the reaction product of trioxane and an ester derivative of 1,2,6-hexanetriol formal, said copolymer having a ratio of units derived from said ester derivative of 1,2,6-hexanetriol formal to units derived from trioxane of between 1:5000 to 1:1, and having a molecular weight of

TABLE 1

| SAMPLE NO. | HTFA FEED | | | TRIOXANE FEED | | | INITIATOR FEED | TOTAL |
|---|---|---|---|---|---|---|---|---|
| | Vol. (cc) | Wt. % | Mole % | Vol. (cc) | Wt. % | Mole | (BF₃ PPM) | CHARGE (g) |
| 1-1 | 1.80 | 3.52 | 0.58 | 45.0 | 96.48 | 99.42 | 51 | 54.57 |
| 1-2 | 3.60 | 6.81 | 1.15 | 45.0 | 93.19 | 98.85 | 49 | 56.49 |
| 1-3 | 1.80 | 3.52 | 0.58 | 45.0 | 96.48 | 99.42 | 101 | 54.57 |
| 1-4 | 3.60 | 6.81 | 1.15 | 45.0 | 93.19 | 98.85 | 98 | 56.49 |
| 1-5 | 1.80 | 3.52 | 0.58 | 45.0 | 96.48 | 99.42 | 101 | 54.57 |
| 1-6 | 3.60 | 6.81 | 1.15 | 45.0 | 93.19 | 98.85 | 98 | 56.49 |
| 1-7 | 1.80 | 3.53 | 0.58 | 45.0 | 96.47 | 99.42 | 51 | 54.58 |
| 1-8 | 3.60 | 6.82 | 1.15 | 45.0 | 93.18 | 98.85 | 49 | 56.50 |
| 1-9 | 1.80 | 3.53 | 0.58 | 45.0 | 96.47 | 99.42 | 101 | 54.58 |
| 1-10 | 3.60 | 6.82 | 1.15 | 45.0 | 93.18 | 98.85 | 98 | 56.50 |

TABLE 2

| SAMPLE NO. | REACTION TIME (MIN.) | % OVERALL YIELD |
|---|---|---|
| 1-1 | 20 | 23.27 |
| 1-2 | 20 | 41.85 |
| 1-3 | 20 | 23.28 |
| 1-4 | 20 | 29.12 |
| 1-5 | 120 | 16.02 |
| 1-6 | 120 | 48.28 |
| 1-7 | 20 | 15.83 |
| 1-8 | 20 | 12.44 |
| 1-9 | 20 | 19.99 |
| 1-10 | 20 | 24.71 |

As is evident from the Examples above, the present invention achieves novel acetal copolymers via the cationic copolymerization of trioxane and 1,2,6-hexanetriol formal or its ester derivatives. The acetal copolymers will, moreover, have pendant functional groups derived from the 1,2,6-hexanetriol formal or the ester derivatives of 1,2,6-hexanetriol formal—that is, pendant hydroxyl or ester moieties which survive the copolyup to about 500,000, thermal stability in excess of 200° C., and greater than about 40% crystallinity.

3. An acetal copolymer as in claim 2, wherein said 1,2,6-hexanetriol formal or its ester derivatives are of the formula:

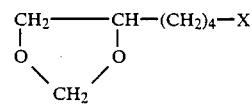

where X is an ester radical.

4. An acetal copolymer as in claim 3, wherein X is represented by the formulas;

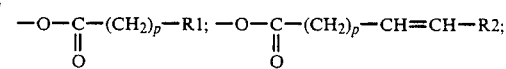

-continued

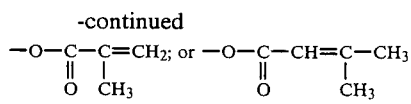

where each p is an integer from zero to 8, R1 is a methyl or phenyl radical, and R2 is hydrogen or a methyl or phenyl radical.

5. An acetal copolymer as in claim 4, wherein X is an acetate radical, an acrylate radical, or a methacrylate radical.

6. An acetal copolymer as in claim 4, wherein X is a halogen substituted ester.

7. An acetal copolymer as in claim 6, wherein said halogen substituted ester is a halogen substituted alkanoic acid.

8. An acetal copolymer as in claim 7, wherein said halogen substituted ester is 2-chloro-ethanoic acid or 3-chloro-propanoic acid.

9. An acetal copolymer as in claim 1, further comprising in the polymer chain units derived from ethylene oxide, 1,3-dioxolane, 1,3-dioxepane, 1,3-dioxep-5-ene, and 1,3,5-trioxepane.

10. A method of making an acetal copolymer comprising polymerizing, under acetal copolymerization conditions, trioxane and an ester derivative of 1,2,6-hexanetriol formal.

11. A method as in claim 10, further comprising polymerizing trioxane, an ester derivative of 1,2,6-hexanetriol formal, and at least one additional comonomer selected from the group consisting of cyclic ethers and cyclic acetals.

12. A method as in claim 11, wherein said additional comonomer is at least one selected from the group consisting of ethylene oxide, 1,3-dioxolane, 1,3-dioxepane, 1,3-dioxep-5-ene, and 1,3,5-trioxepane.

13. A method of making an acetal copolymer of the formula:

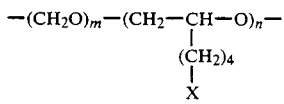

where X is an ester radical or a hydroxyl radical obtained by hydrolyzing an ester radical, m and n are each integers such that m+n is between 5 to 20000, and the mole ratio of units of subscript n to the units of subscript m is between about 1:5000 to 1:1, which method comprises cationically copolymerizing trioxane and an ester derivative of 1,2,6-hexanetriol formal of the formula:

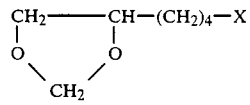

where X is an ester radical.

14. A method as in claim 13, wherein X is represented by the formulas;

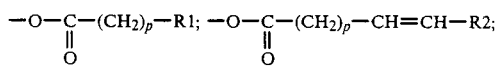

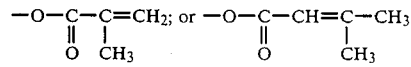

where each p is an integer from zero to 8, $R_1$ is a methyl or phenyl radical, and R2 is hydrogen or a methyl or phenyl radical.

15. A method as in claim 13, wherein X is an acetate radical, an acrylate radical or a methacrylate radical.

16. A method as in claim 13, wherein said copolymerization is initiated with boron trifluoride.

17. A method as in claim 13, wherein said copolymerization is initiated with a coordination complex of boron fluoride.

18. A method as in claim 17, wherein said coordination complex of boron fluoride is boron trifluoride etherate.

19. A method as in claim 10, further comprising subjecting the acetal copolymer to hydrolysis conditions sufficient to hydrolyze pendant ester groups thereof derived from said ester derivative of 1,2,6-hexanetriol formal to obtain pendant hydroxyl groups.

20. A method as in claim 13 or 14, further comprising subjecting the acetal copolymer to hydrolysis conditions sufficient to hydrolyze pendant ester groups thereof derived from said ester derivative of 1,2,6-hexanetriol formal to obtain pendant hydroxyl groups.

* * * * *

UNITED STATES PATENT AND TRADEMARK OFFICE
CERTIFICATE OF CORRECTION

PATENT NO. : 4,975,518

DATED : December 4, 1990

INVENTOR(S) : Broussard et al

It is certified that error appears in the above-identified patent and that said Letters Patent is hereby corrected as shown below:

Title Page:
Under Abstract, line 4, after "HTF" delete "formal".

Column 2, line 37, change $(-CH_2O)$ to $(-CH_2O-)$

Column 3, line 30, change $(BF_3 \cdot 19\ Et_2O)$ to $(BF_3 \cdot Et_2O)$

Signed and Sealed this

Ninth Day of June, 1992

*Attest:*

DOUGLAS B. COMER

*Attesting Officer*   Acting Commissioner of Patents and Trademarks